(12) United States Patent
Lasaar et al.

(10) Patent No.: US 9,863,532 B2
(45) Date of Patent: Jan. 9, 2018

(54) HYDROSTATIC VARIABLE DISPLACEMENT PUMP WHICH CAN BE SET IN EITHER DIRECTION OF DISPLACEMENT

(71) Applicant: Linde Hydraulics GmbH & Co. KG, Aschaffenburg (DE)

(72) Inventors: Rolf Lasaar, Grossostheim (DE); Markus Jung, Aschaffenburg (DE)

(73) Assignee: Linde Hydraulics GmbH & Co. KG, Aschaffenburg (DE)

(*) Notice: Subject to any disclaimer, the term of this patent is extended or adjusted under 35 U.S.C. 154(b) by 448 days.

(21) Appl. No.: 14/192,927

(22) Filed: Feb. 28, 2014

(65) Prior Publication Data

US 2014/0311139 A1 Oct. 23, 2014

(30) Foreign Application Priority Data

Mar. 13, 2013 (DE) ........................ 10 2013 102 533

(51) Int. Cl.

| F16H 61/46 | (2010.01) |
|---|---|
| F16H 61/4192 | (2010.01) |
| F16H 61/431 | (2010.01) |
| F16H 61/439 | (2010.01) |
| F04B 49/00 | (2006.01) |

(52) U.S. Cl.
CPC .......... *F16H 61/46* (2013.01); *F04B 49/002* (2013.01); *F16H 61/4192* (2013.01); *F16H 61/431* (2013.01); *F16H 61/439* (2013.01); *F15B 2211/20553* (2013.01); *F15B 2211/8752* (2013.01)

(58) Field of Classification Search
CPC .... F04B 49/002; F16H 61/431; F16H 61/439; F16H 61/46; F16H 61/4192; F15B 20/008; F15B 2211/20553; F15B 2211/8752
See application file for complete search history.

(56) References Cited

U.S. PATENT DOCUMENTS

| 4,528,813 A | * | 7/1985 | Izumi | .................... F16H 61/431 417/218 |
|---|---|---|---|---|
| 4,543,787 A | * | 10/1985 | Eckhardt | ............... F16H 61/472 60/444 |
| 5,160,245 A | * | 11/1992 | Geringer | ............... F04B 49/002 417/218 |

(Continued)

FOREIGN PATENT DOCUMENTS

| DE | 4335086 C1 | * | 3/1995 | ............ F15B 20/008 |
|---|---|---|---|---|
| DE | 19935007 A1 | * | 2/2001 | ........... F16H 61/431 |

*Primary Examiner* — Nathaniel Wiehe
*Assistant Examiner* — Abiy Teka
(74) *Attorney, Agent, or Firm* — The Webb Law Firm

(57) ABSTRACT

A hydrostatic variable displacement pump (2) has a displacement volume set by an electro-hydraulic control device (10) provided with a safety function. In a fault scenario, the variable displacement pump (2) is set to a neutral position. The electro-hydraulic control device (10) has a single electro-hydraulic setpoint encoder (30) to specify the setpoint of the displacement volume of the variable displacement pump (2) and an electrically actuatable valve device (35) connected in series downstream of the setpoint encoder (30), by which the direction of displacement of the variable displacement pump (2) is controlled and which is provided with the safety function.

16 Claims, 4 Drawing Sheets

(56) References Cited

U.S. PATENT DOCUMENTS 6,655,136 B2 * 12/2003 Holt .................... E02F 9/2207
60/414
8,661,804 B2 * 3/2014 Wagner ................ F04B 49/002
60/327

* cited by examiner

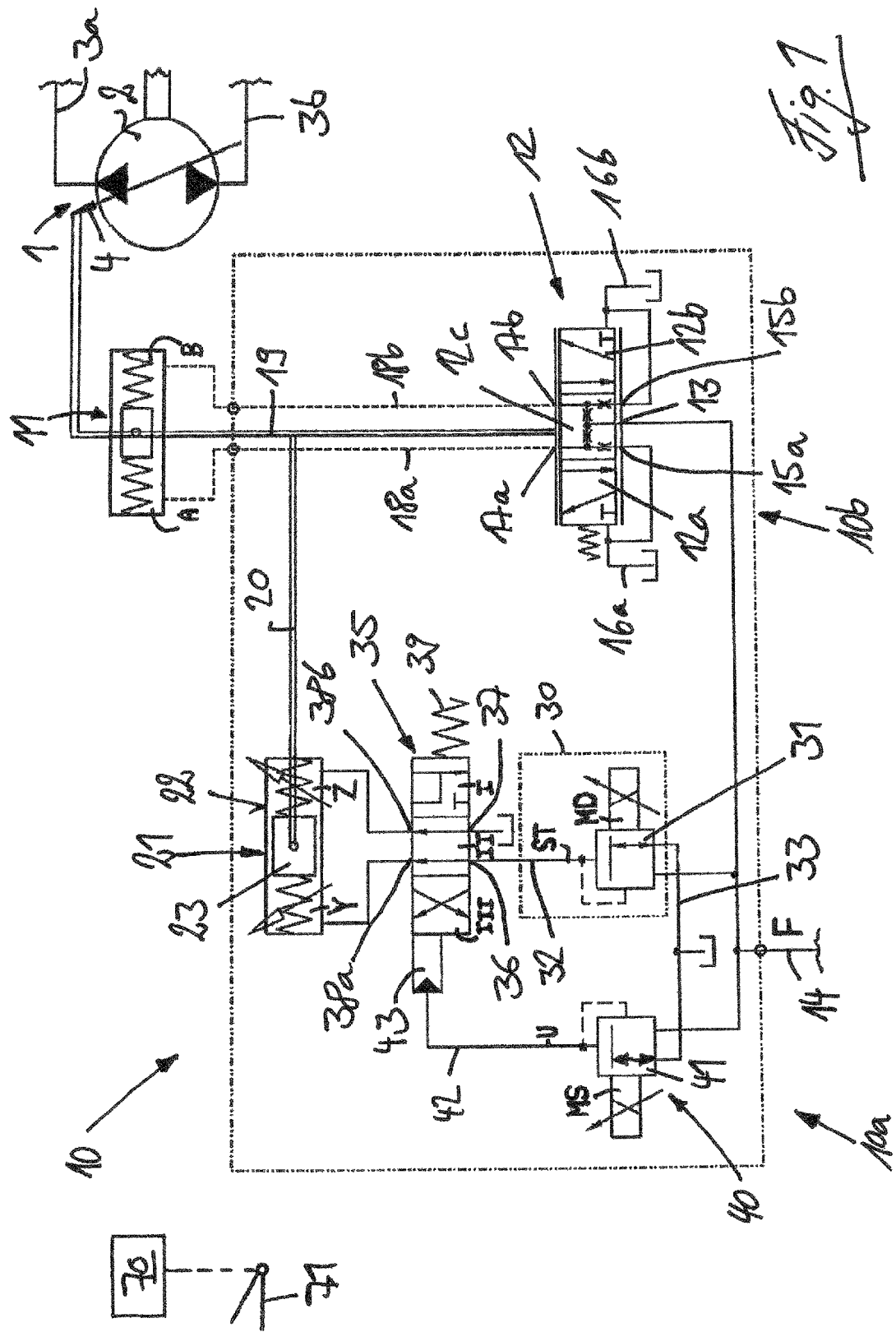

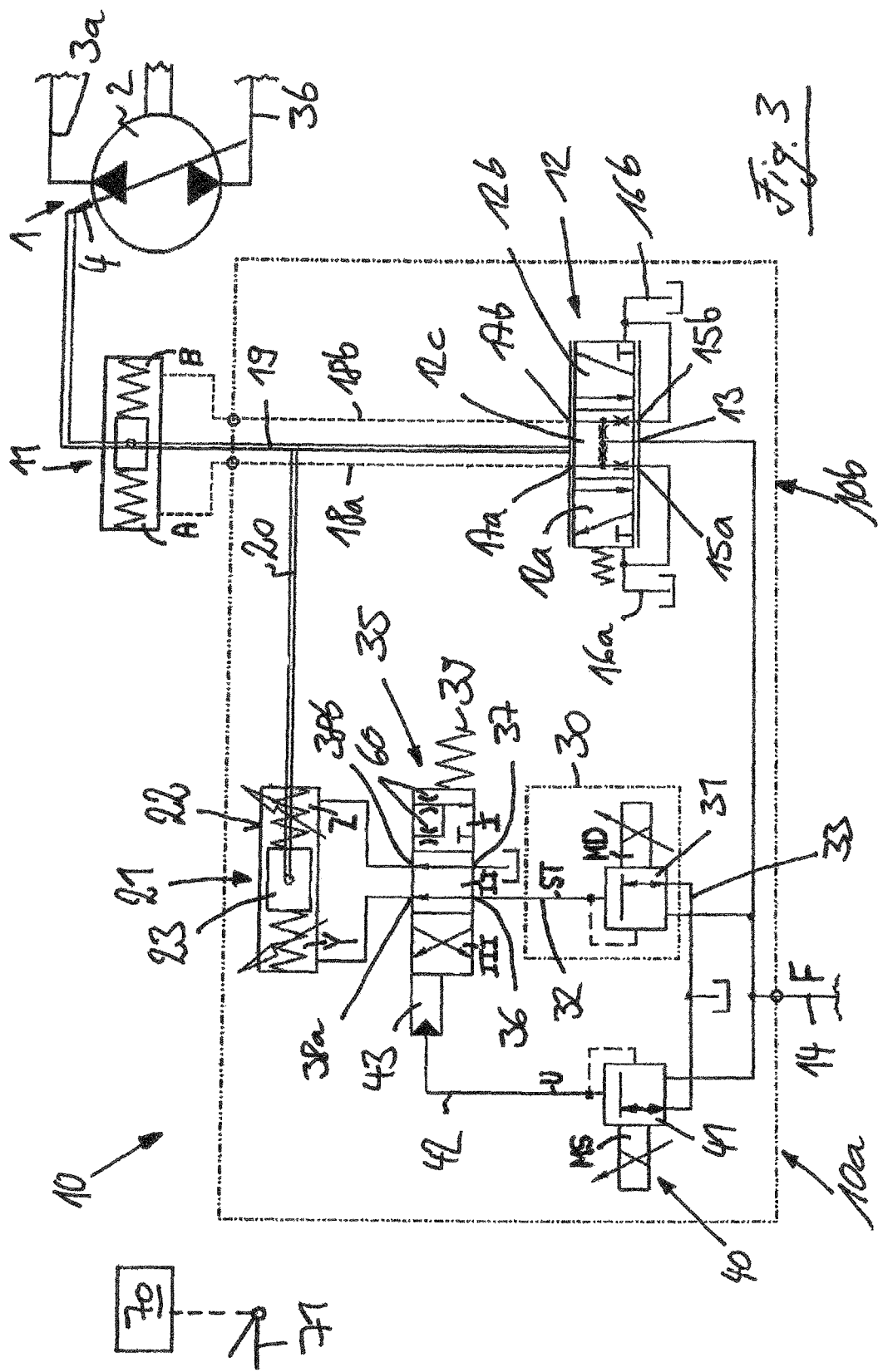

HYDROSTATIC VARIABLE DISPLACEMENT PUMP WHICH CAN BE SET IN EITHER DIRECTION OF DISPLACEMENT

CROSS REFERENCE TO RELATED APPLICATION

This application claims priority to German Application No. DE 102013102533.1 filed Mar. 13, 2013, which is herein incorporated by reference in its entirety.

BACKGROUND OF THE INVENTION

Field of the Invention

This invention relates to a hydrostatic variable displacement pump, in particular an axial piston pump employing a swashplate construction, the displacement volume of which can be varied in opposite displacement directions starting from a neutral position in which the displacement volume is zero. The displacement volume can be varied by an electro-hydraulic actuator device, which is provided with a safety function to ensure that the variable displacement pump is set in the neutral position in the event of a fault scenario.

Description of Related Art

Hydrostatic variable displacement pumps that can be varied in both directions of displacement from a neutral position in which the displacement volume is zero and operated in a closed circuit can be used, for example, as pumps in hydrostatic transmissions to function as traction drives for vehicles, such as mobile machines. The variable displacement pump, which can be continuously varied in both directions of displacement, is connected in a closed circuit with one or more hydrostatic motors, such as one or more constant displacement motors with a constant intake volume or one or more variable displacement motors with a variable intake volume. By varying the displacement volume of the variable displacement pump, and in the case of variable displacement motors by varying the intake volume of the variable displacement motor, the translation ratio of the hydrostatic transmission formed by the closed circuit can be continuously varied. Thus, the speed of travel of the vehicle can be continuously varied. The direction of displacement of the variable displacement pumps in closed circuit hydrostatic transmissions of this type determines the direction of travel of the machine. By varying the displacement volume of the variable displacement pump, the acceleration and deceleration of the vehicle can be controlled both in the forward direction of travel and in the reverse direction of travel.

In these hydrostatic transmissions, the adjustment characteristics (behavior) of the displacement volume of the variable displacement pump characterizes the behavior of the hydrostatic transmission and, in the case of a traction drive, the traction response of the vehicle. Properties such as precision control and dynamic response can be achieved effectively with the variable displacement pump by an electro-hydraulic actuator device to vary and set the displacement volume. The electrical input signal of the electro-hydraulic actuator device is a current generated by an electronic control device. As a result of which, in a hydrostatic traction drive, the traction characteristics of the vehicle can be freely programmed and stored in the software of the electronic control device.

The ability to vary the displacement volume of the variable displacement pump represents an additional safety feature if people are present in the immediate vicinity of the vehicle. To guarantee safe conditions when the hydrostatic transmission is a traction drive, it is necessary to be able to reliably reset the variable displacement pump into the neutral position where the displacement volume is zero to bring the vehicle to a stop and keep it stationary in the event of a fault scenario, e.g., a system error or the failure of an electronic or electrical component.

For this purpose, electro-hydraulic actuator devices of variable displacement pumps are provided with a safety function which, in the event of a fault scenario, ensures that the variable displacement pump is reset into the neutral position.

A hydrostatic traction device with a variable displacement pump and an electro-hydraulic actuator device provided with a safety function of the general type described above is disclosed in DE 43 35 086 C1. To set the displacement of the variable displacement pump in either of two directions, the electro-hydraulic actuator device of DE 43 35 086 C1 has two identically constructed electro-hydraulic setpoint encoders in the form of electrically actuated pressure reducing valves, each of which specifies a setpoint for the displacement volume in the form of a control pressure that is applied to a slave piston for each direction of displacement of the variable displacement pump. The slave cylinder has two control pressure chambers that act in opposition to each other. A particular control pressure chamber of the slave piston, and thus a direction of displacement of the variable displacement pump, is associated with each pressure reducing valve. Each pressure reducing valve is actuated by a magnet to generate a control pressure that is applied to the associated control pressure chamber of the slave piston. The safety function is provided by a depressurization valve that is electrically actuated by an additional magnet, which actuates spring-loaded safety valves on the pressure reducing valves to deactivate them.

In the event of a fault scenario, the current feed to the magnet of the depressurization valve is terminated so that the spring-loaded safety valves displace the pressure reducing valves toward a reduction of the control pressure in order to deactivate the pressure reducing valves. The control pressure chambers of the slave piston are depressurized to a tank in the event of the fault scenario. As a result of which, the spring-centered slave piston is actuated by the springs into the center position and, thus, the variable displacement pump is set in the neutral position where the displacement volume is zero and the vehicle is brought to a stop.

On variable displacement pumps of this type, the electro-hydraulic actuator device has two identically constructed electro-hydraulic setpoint encoders, each of which is actuated by a magnet, to set the variable displacement pump in either of two directions of displacement, plus a depressurization valve that is electrically actuated by an additional magnet for the safety function to deactivate the two setpoint encoders in the event of a failure scenario. This arrangement entails a great deal of construction effort and expense on account of the large number of valves and magnets required. Moreover, because the two electro-hydraulic setpoint encoders each require a valve axis and the electrically actuated depressurization valve requires an additional third valve axis, an electro-hydraulic actuator device with a safety function of this type requires a great deal of space.

SUMMARY OF THE INVENTION

Therefore, it is an object of this invention to provide a variable displacement pump with an electro-hydraulic actuator device having a safety function, which guarantees the same level of safety of known devices but with reduced construction effort and expense and which requires less space than known systems.

The invention teaches that the electro-hydraulic actuator device has a single electro-hydraulic setpoint encoder to specify the setpoint of the displacement volume of the variable displacement pump and also has an electrically actuatable valve device connected in series downstream of the setpoint encoder, by means of which both directions of displacement of the variable displacement pump can be controlled and which provides the safety function. The electro-hydraulic actuator device of the invention has only one electro-hydraulic setpoint encoder which specifies a setpoint for the volume of displacement for both directions of displacement of the variable displacement pump. The association of the setpoint generated by the single electro-hydraulic setpoint encoder with the direction of displacement of the variable displacement pump is created by an electrically actuatable valve device provided with a safety function so that in the event of a fault scenario, the variable displacement pump is reset into the neutral position in which the displacement volume is zero. Due to the elimination of the second electro-hydraulic setpoint encoder, the electro-hydraulic actuator device of the invention entails less construction effort and expense on account of the reduction of the number of electrical components and occupies less space because only one valve axis is necessary for the electro-hydraulic setpoint encoder plus a second valve axis for the electrically actuatable valve device.

In one advantageous embodiment of the invention, the electro-hydraulic setpoint encoder is in communication on the input side with a control pressure source and is in communication on the output side with a control pressure connection of the valve device. With an electro-hydraulic setpoint encoder of this type, a variable control pressure can be generated from the supply pressure from the control pressure source as a setpoint for the displacement volume of the variable displacement pump by a corresponding electrical actuation of the setpoint encoder, which is associated with the corresponding direction of displacement by the valve device.

In one advantageous embodiment of the invention, the electro-hydraulic setpoint encoder is an electrically actuatable pressure reducing valve, in particular a proportional pressure reducing valve. With an electrically actuatable pressure reducing valve, it becomes possible in a simple manner to generate a control pressure which is proportional to the electrical actuation signal to specify the volume of displacement.

In one advantageous embodiment of the invention, the valve device has a tank connection, a first control connection in communication with a control pressure chamber of a slave piston device which acts in a first direction of displacement, and a second control connection in communication with a control pressure chamber of the slave piston device which acts in the direction of a second direction of displacement. With a valve device of this type, it is possible in a simple manner to associate the control pressure generated by the control pressure encoder optionally with one of the two control pressure chambers of the slave piston device to control the directions of displacement of the variable displacement pump and, when the pump is a traction drive, to control the directions of travel of the vehicle.

The slave piston device is advantageously spring-centered. In the unactuated state, the slave piston device is actuated by springs into a center position and, accordingly, resets the variable displacement pump into the neutral position in which the displacement volume is zero.

In one embodiment of the invention, the valve device has two control positions to control the two directions of displacement of the variable displacement pump. A first control position is provided for the first direction of displacement in which the control pressure connection is in communication with the first control connection and the second control connection is in communication with the tank connection. A second control position is provided for the second direction of displacement in which the control pressure connection is in communication with the second control connection and the first control connection is in communication with the tank connection. In both control positions, by transmitting the control pressure generated by the control pressure encoder to the corresponding control pressure chamber of the slave piston device, it is possible in a simple manner to control the direction of displacement, and thus to set the variable displacement pump to the displacement setpoint volume specified by the control pressure.

It is particularly advantageous if the valve device has a safety position for the safety function in which the first control connection as well as the second control connection are in communication with the tank connection and/or are short-circuited. This arrangement makes it possible in a simple manner to depressurize both control pressure chambers of the slave piston device so that in the safety position, the spring-centered slave piston device is actuated into the center position and the variable displacement pump is securely set in the neutral position in which the displacement volume is zero.

In the safety position, the control pressure connection is advantageously shut-off.

It is particularly advantageous if the valve device is actuated into the safety position by a spring device and is actuated by an electrical actuator device toward the first control position or the second control position. In the event of a fault scenario or a failure of the electronic or electrical components, it is thereby ensured that the valve device is actuated by the spring device into the safety position to reset the variable displacement pump into the neutral position in which the displacement volume is zero.

In one advantageous embodiment of the invention, the electrical actuator device is an electrically actuatable pressure reducing valve, in particular a proportional pressure reducing valve, which generates an actuation pressure that actuates the valve device. With an electrically actuatable pressure reducing valve, it is possible in a simple manner to generate a variable actuation pressure to actuate the valve device against the force of the spring device into the appropriate control position for selection of the direction of displacement of the variable displacement pump.

With an eye toward reducing the construction effort and expense required for the valve device, in one embodiment of the invention it is advantageous if the valve device is a spool valve with a longitudinally displaceable slide valve member.

In one development of the invention, the valve device is provided with an orifice structure for the control pressure chambers of the slave piston device and the orifice structure is active in the safety function. With an orifice structure for the control pressure chambers of the slave piston device which is active only in the safety function, it becomes possible in the event of a fault scenario to control the reduction of the control pressure present in the corresponding control pressure chamber of the slave piston device so that the slave piston device can be reset into the center position and the variable displacement pump can be actuated into the neutral position.

The slave piston device advantageously actuates a position-controlled control valve of the actuator device, which actuates a control piston device of the variable displacement pump which is in an operative connection with a displacement volume control mechanism. With a control device of this type, the position of the slave piston device actuated by the control pressure physically reproduces the setpoint for the setting of the displacement volume control mechanism and, thus, the displacement volume of the variable displacement pump. The position-controlled control valve, which actuates the control piston device of the variable displacement pump which is in an operative connection with a displacement volume control mechanism and which tracks the current value of the position of the displacement volume control mechanism, represents a hydraulic-mechanical closed-loop control circuit to match the position of the displacement volume control mechanism to the position of the slave piston device.

The control valve advantageously has a control pressure feed connection in communication with the control pressure source, at least one tank connection in communication with the tank, a first control pressure connection in communication with a first control pressure chamber of the control piston device by a first control pressure line, and a second control pressure connection which is in communication with a second control pressure chamber of the control piston device by a second control pressure line. With a control valve of this type, by pressurizing the appropriate control pressure chamber of the control piston device with the pressure supplied by the control pressure source, the variable displacement pump can be actuated in a simple manner from the neutral position into either direction of displacement.

The control piston device is preferably spring-centered. In the unactuated position, the control piston device is actuated by springs into a center position and the variable displacement pump is accordingly set into the neutral position where the displacement volume is zero.

In one advantageous development of the invention, the valve device is provided with an orifice structure in the control pressure lines of the control piston device, which is active in the safety function. With an orifice structure in the control pressure lines of the control piston device that is active only in the safety function, a switchable orifice structure in the control piston device is provided which, in the event of a fault scenario, defines the speed of adjustment of the displacement volume control mechanism of the variable displacement pump into the neutral position and when the variable displacement pump is used in a hydrostatic traction drive, controls the deceleration of the vehicle. As a result of the integration of the switchable orifice structure into the valve device, additional advantages are achieved with regard to the amount of construction effort and expense required and the space occupied since an additional valve with an additional valve axis is not required for the switchable orifice structure of the control piston device.

The orifice structure in the control piston device can be integrated into the valve device with little added construction effort or expense if, as in one development of the invention, the valve device forms flow segments of the control pressure lines, in which throttle devices for throttling the control pressure lines are active only in the safety position.

The invention further relates to a hydrostatic transmission, in particular a hydrostatic traction drive of a vehicle, with a variable displacement pump of the invention which is in communication in a closed circuit with at least one hydrostatic motor. The variable displacement pump of the invention makes it possible to achieve with little additional construction effort or expense and requiring little space in a hydrostatic traction drive of the vehicle a safety function by means of the electro-hydraulic control device of the invention which, in the event of a fault scenario or a system malfunction, resets the variable displacement pump into the neutral position to bring the vehicle to a stop.

BRIEF DESCRIPTION OF THE DRAWINGS

Additional advantages and details of the invention are described in greater detail below with reference to the exemplary embodiments illustrated in the accompanying schematic figures, in which like reference numbers identify like parts throughout.

FIG. 1 is a schematic diagram of a first embodiment of a variable displacement pump of the invention;

FIG. 3 is a first development of FIG. 1; and

DESCRIPTION OF THE PREFERRED EMBODIMENTS

Figure 2A:
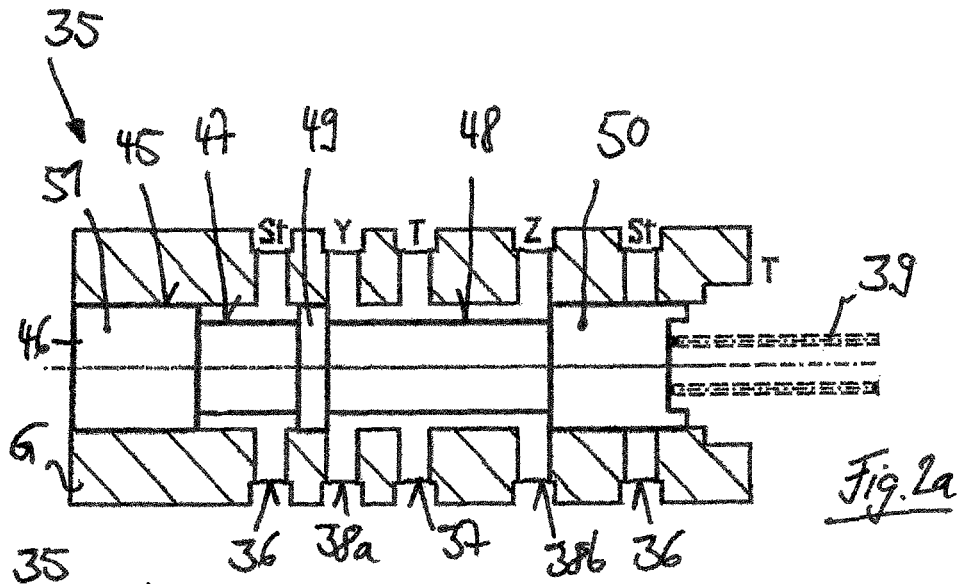
FIGS. 2a-2c show an electrically actuatable valve device of the variable displacement pump of the invention in a longitudinal section in various switched positions.

FIG. 1 is a circuit diagram of a hydrostatic transmission 1 in a closed circuit, for example of a hydrostatic traction drive of a vehicle, such as a mobile machine.

A drive engine, such as an internal combustion engine (not illustrated in detail), drives a hydrostatic variable displacement pump 2 which is in communication in a closed circuit with at least one hydraulic user, such as a hydraulic motor in the form of a traction motor (not illustrated in detail). The closed circuit of the hydrostatic transmission 1 is formed by a first hydraulic line 3a and a second hydraulic line 3b.

The variable displacement pump 2 has a variable displacement volume and for setting the displacement volume is provided with a displacement volume control mechanism 4, such as a swashplate with a variable inclination in the form of a cradle of an axial piston machine utilizing a swashplate construction which, for its setting, is in an operative connection with an electro-hydraulic control device 10 of the invention. The variable displacement pump 2 can be set in both directions of displacement from a neutral position in which the displacement volume is zero to deliver hydraulic fluid into the hydraulic line 3a or into the hydraulic line 3b.

The electro-hydraulic control device 10 includes a slave circuit 10a and a control circuit 10b.

The slave circuit 10a forms a setpoint for the displacement volume and therefore a setpoint position for the displacement volume control mechanism 4. The control circuit 10b forms a hydraulic-mechanical closed-loop control circuit to match the current value and, thus, the current position, of the displacement volume control mechanism 4 to the specified setpoint.

The control circuit 10b comprises a control piston device 11 provided with a first control pressure chamber A and a second control pressure chamber B. The control piston device 11 is centered in the center position by one or more springs and is in an operative connection with the displacement volume control mechanism 4. In the illustrated exemplary embodiment, the control piston device 11 is in the form of a control piston with two control pressure chambers A, B that act in opposite directions. Alternatively, the control piston device 11 can be in the form of two control pistons that act in opposite directions, each with a control pressure chamber, A and B, respectively. The center position of the control piston device 11 corresponds to the neutral position of the displacement volume control mechanism 4 at which the displacement volume is zero.

A position-controlled control valve 12 in the form of a pilot valve is provided to control the pressurization of the control pressure chambers A, B of the control piston device 11. The control valve 12 has a control pressure supply connection 13 in communication with a control pressure supply line 14 of a control pressure source F, for example, a charge pressure pump. The control pressure source F generates a constant supply pressure in the control pressure supply line 14.

Tank connections 15a, 15b of the control valve 12 are connected with the tank by discharge lines 16a, 16b.

The control valve 12 also has a first control pressure connection 17a in communication with the first control pressure chamber A of the control piston 11 by a first control pressure line 18a. A second control pressure connection 17b of the control valve 11 is in communication with the second control pressure chamber B of the control piston device 11 by a second control pressure line 18b. The control piston device 11, and thus the displacement volume control mechanism 4, is in an operative communication with the control valve 12 by mechanical coupling means 19 for feedback of the current position of the displacement volume control mechanism 4.

The control valve 12, e.g., a control valve slide member of the control valve 12, is also in an operative connection with a slave piston device 21 of the slave circuit 10a by a mechanical coupling means 20 to specify the setpoint of the displacement volume control mechanism 4.

The slave piston device 21 has a slave piston 23 located in a slave cylinder 22 and is longitudinally displaceable in the slave cylinder 22. Between the slave cylinder 22 and the slave piston 23, there is a first control pressure chamber Y which is pressurized by a control pressure ST and a second control pressure chamber Z which is pressurized by the control pressure ST. In each of the control pressure chambers Y, Z there is a spring for spring-centering the slave piston 23 in the center position.

By means of the control pressure ST present in the control pressure chamber Y of the slave piston 23, the control valve 12 is moved to the right in FIG. 1 toward a first control position 12a in which the control pressure line 18a is in communication with the control pressure supply line 14 and the control pressure line 18b is in communication with the tank by the discharge line 16. In this control position 12a, the control piston device 11 is moved by the control pressure present in the control pressure chamber A toward an increase in the displacement volume and the displacement volume control mechanism 4 is moved in a first displacement direction. As a result of which, the variable displacement pump 2 delivers into the first hydraulic line 3a. On a hydrostatic traction drive, for example, this position can correspond to forward travel of the vehicle.

When the control pressure ST is present in the control pressure chamber Z of the slave piston 23, the control valve 12 is moved to the left in FIG. 1 toward a second control position 12b in which the control pressure line 18b is placed in communication with the control pressure supply line 14, and the control pressure line 18a is in communication with the tank. Thus, the control piston device 11 is moved by the control pressure present in the control pressure chamber B in the direction of an increase of the displacement volume, and the displacement volume control mechanism 4 is moved in a second displacement direction so that the displacement pump 2 delivers into the second hydraulic line 3b. On a hydrostatic traction drive, this position corresponds to reverse travel of the vehicle.

The level of the control pressure ST in the control pressure chambers Y and Z, respectively, of the slave piston 23 represents, for the corresponding displacement direction of the variable displacement pump 2, a setpoint for the position of the displacement volume control mechanism 4 and, thus, of the displacement volume of the variable displacement pump 2. When the control pressure ST is present in one of the two control pressure chambers Y or Z, the slave piston 23 of the slave circuit 10a moves against the force of the corresponding spring into a position proportional to the control pressure ST, which corresponds to a setpoint for the position of the displacement volume control mechanism 4.

In the control circuit 10b, the current position of the displacement volume control mechanism 4 is matched to the specified setpoint of the slave piston 23 by the position-controlled control valve 12.

In the unactuated state, the slave piston 23 is in the spring-centered center position and the control valve 12 is in a neutral position 12c. In the illustrated exemplary embodiment, in the neutral position 12c of the control valve 12, a pressure dividing circuit formed by the illustrated nozzles is active to generate an average pressure level from the control pressure supply connection 13 in the control pressure lines 18a, 18b and the control pressure chambers A, B of the control piston device 11, so that the control pressure chambers A, B of the control piston device 11 are held (preloaded) in the center position in which they are spring-centered by springs to achieve a high level of stability. In the center position of the control piston device 11, the displacement volume control mechanism 4 is in a neutral position in which the variable displacement pump has a displacement volume of zero.

To generate a variable control pressure ST to pressurize the control pressure chambers Y and Z, respectively, of the slave piston 23, the electro-hydraulic control device 10 of the invention has a single electro-hydraulic setpoint encoder 30 to specify the displacement volume of the variable displacement pump 2 for both directions of displacement.

The electro-hydraulic setpoint encoder 30 is preferably an electrically actuatable pressure reducing valve 31, in particular a proportional pressure reducing valve. The pressure reducing valve 31 is in communication on the input side with the control pressure source F and is connected to the control pressure supply line 14. A control pressure line 32 that carries the generated control pressure ST is connected to the pressure reducing valve 31 on the output side. The control pressure line 32 can be depressurized to a tank via a tank connection 33 of the pressure reducing valve 31.

The setpoint encoder 30, which is in the form of a pressure reducing valve 31, can be actuated by a magnet MD, such as a proportional magnet. The magnet MD is in communication for actuation with an electronic control device 70 which, when the actuating means 71 (such as an accelerator pedal on a hydrostatic traction drive) are actuated, generates an actuation current for the actuation of the magnet MD. The control pressure ST generated by the pressure reducing valve 31 is proportional to the actuation current of the magnets MD.

To be able to adjust the variable displacement pump 2 in both displacement directions with the single electro-hydraulic setpoint encoder 30 by a corresponding actuation of the control pressure chambers Y or Z of the slave piston 23 with the control pressure ST generated by the setpoint encoder 30, and to achieve the safety function, the electro-hydraulic control device 10 is provided with an electrically actuatable valve device 35 connected in series downstream of the setpoint encoder 30, by means of which the displacement direction of the variable displacement pump 2 is controlled and which is provided with the safety function.

The valve device 35 is provided with a control pressure connection 36 connected to the control pressure line 32 of the setpoint encoder 30 which carries the control pressure ST.

The valve device 35 has a tank connection 37, a first control connection 38a in communication with the control pressure chamber Y of the slave piston 23 that is active in the direction of a first displacement direction, and a second control connection 38b in communication with the control pressure chamber Z of the slave piston 23 which is active in the direction of the second displacement direction.

For control of both displacement directions of the variable displacement pump 2, the valve device 35 has a first control position II for the first displacement direction in which the control pressure connection 36 is in communication with the first control connection 38a and the second control connection 38b is in communication with the tank connection 37; and a second control position III for the second displacement direction in which the control pressure connection 36 is in communication with the second control connection 38b and the first control connection 38a is in communication with the tank connection 37.

For the safety function, the valve device 35 is provided with a safety position I in which the control pressure connection 36 is shut off and the first control connection 38a, as well as the second control connection 38b, are short-circuited and are in communication with the tank connection 37.

The valve device 35 is moved by a spring device 39 into the safety position I and is actuated by the electrical actuator device 40 toward the first control position II or the second control position III.

The electrical actuator device 40 is an electrically actuatable pressure reducing valve 41, in particular a proportional pressure reducing valve, which generates a variable actuation pressure U which actuates the valve device 35.

The pressure reducing valve 41 is in communication on the input side with the control pressure source F and is connected to the control pressure supply line 14. A control pressure line 42 that carries the generated actuation pressure U is connected to the pressure reducing valve 31. The control pressure line 42 is in communication with a control pressure chamber 43 of the valve device 35 that acts in the direction of the control positions II, III. The control pressure line 42 can be depressurized to a tank by a tank connection 33 of the pressure reducing valve 41.

The actuator device 40, in the form of the pressure reducing valve 41, can be actuated by a magnet MS, such as a proportional magnet. The magnet MS is in communication with the electronic control device 70 for its actuation.

Figure 2B:
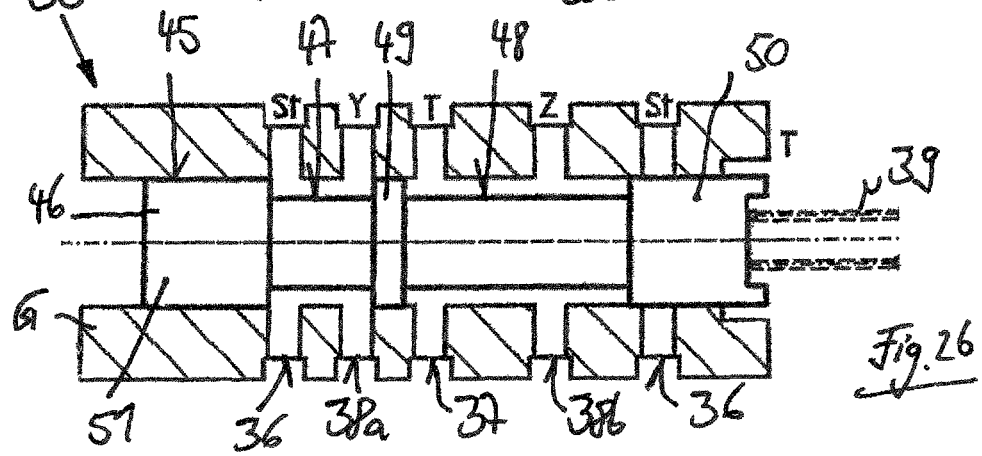
Figure 2C:
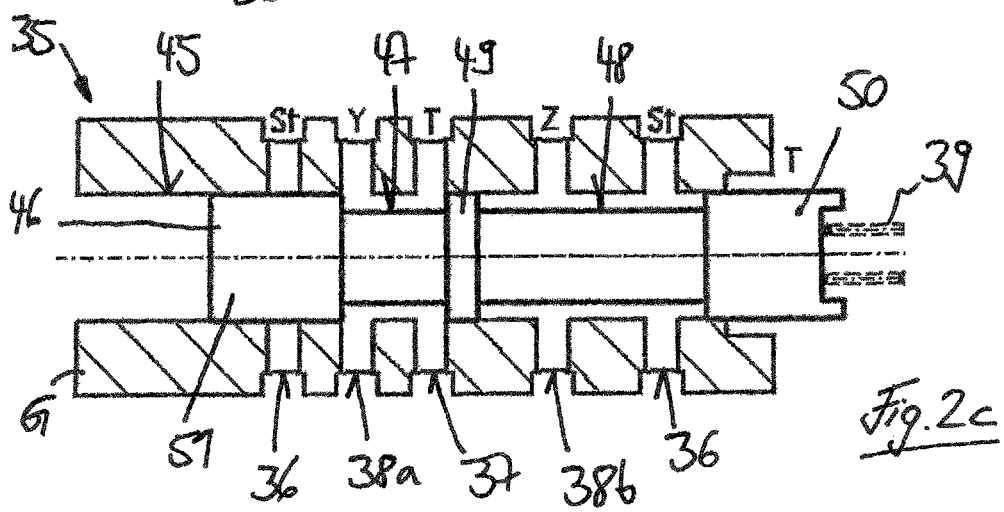

FIGS. 2a-2c show one constructive embodiment of the valve device 35 in the different switching positions I, II, and III.

The valve device 35 is preferably a spool valve with a valve member 46 that can be displaced longitudinally in a housing boring 45 of the housing G. The tank connection 37 is located centrally on the housing boring 45. The first control connection 38a and the second control connection 38b, respectively, are located at some distance on both sides of the tank connection 37. A control pressure connection 36 is located at an even greater distance outwardly on each side. For control of the flow connections, the valve slide member 46 is provided with two annular grooves 47, 48, which are separated from each other by a piston segment 49.

When the magnet MS is not actuated and is not carrying current, the pressure reducing valve 41 does not generate an actuation pressure U so the spring device 39 pushes the valve member 46 to the left into the safety position I of the valve device 35 illustrated in FIG. 2a. A corresponding stop in the housing G can be provided for the valve member 46. In the safety position I, the control connections 38a, 38b, and thus the control pressure chambers Y, Z of the slave piston 23, are short-circuited by the annular groove 48 and are in communication with the tank connection 37. By means of the piston segment 49, the communication of the left control pressure connection 36 with the control connection 38a, and thus with the control pressure chamber Y of the slave piston 23, is shut-off. An additional piston segment 50 of the valve member 46 shuts off the communication of the right control pressure connection 36 with the control connection 38b and, thus, with the control pressure chamber Z of the slave piston 23. In the safety position I, the slave piston 23 is in the center position as a result of the action of the spring, so that the displacement volume control mechanism 4 of the variable displacement pump 2 is set by the control circuit 10b into the neutral position in which the displacement volume is zero.

Independently of the actuation of the setpoint encoder 30 and of the control pressure ST generated by the setpoint encoder 30, during traction drive it becomes possible for the variable displacement pump 2 in the safety position I of the valve device 35 to be placed in the neutral position in which the displacement volume is zero and the vehicle is brought to a stop.

With a defined current feed to the magnet MS of the actuator device 40, the pressure reducing valve 41 generates a defined actuation pressure U which actuates the valve member 46 against the force of the spring device 39 into the first control position II, which is the center position illustrated in FIG. 1 and FIG. 2b. In the control position II, the left control pressure connection 36 is in communication by the annular groove 47 with the first control connection 38a and the second control connection 38b is in communication by the annular groove 48 with the tank connection 37. The piston segment 50 of the valve member 46 shuts off the right control pressure connection 36. With a corresponding actuation of the magnet MD of the setpoint encoder 30, the control pressure ST generated is present in the control pressure chamber Y of the slave piston 23 and the control pressure chamber Z of the slave piston 23 is depressurized to the tank. As a result of which, the variable displacement pump 2 is set in the direction of the first direction of displacement to a displacement volume which is proportional to the control pressure ST.

If the current feed to the magnet MS of the actuator device 40 is increased, the pressure reducing valve 41 generates an increased actuation pressure level U, which moves the valve member 46 farther to the right in FIG. 2c against the force of the spring device and into the second control position III illustrated in FIG. 2c. A corresponding stop for the valve slide member 46 can be formed in the housing G. In the control position III, the first control connection 38 is in communication by the annular groove 47 with the tank connection 37 and the second control connection 38b is in communication via the annular groove 48 with the right control pressure connection 36. A piston segment 51 of the valve slide member 46 shuts off the left control pressure connection 36. In the event of a corresponding actuation of the magnet MD of the setpoint encoder 30, the generated control pressure ST is present in the control pressure chamber Z of the slave piston 23 and the control pressure chamber Y of the slave piston 23 is depressurized to the tank. As a result of which, the variable displacement pump 2 is actuated toward the second direction of displacement at a displacement volume which is proportional to the control pressure ST.

FIG. 3 shows a development of the invention which, in the safety position I of the valve device 35, integrates an orifice structure 60 of the control pressure chambers Y, Z of the slave piston device 21 and, thus, of the slave circuit 10a. The orifice structure 60 can be formed by corresponding nozzles or throttles.

Figure 4:
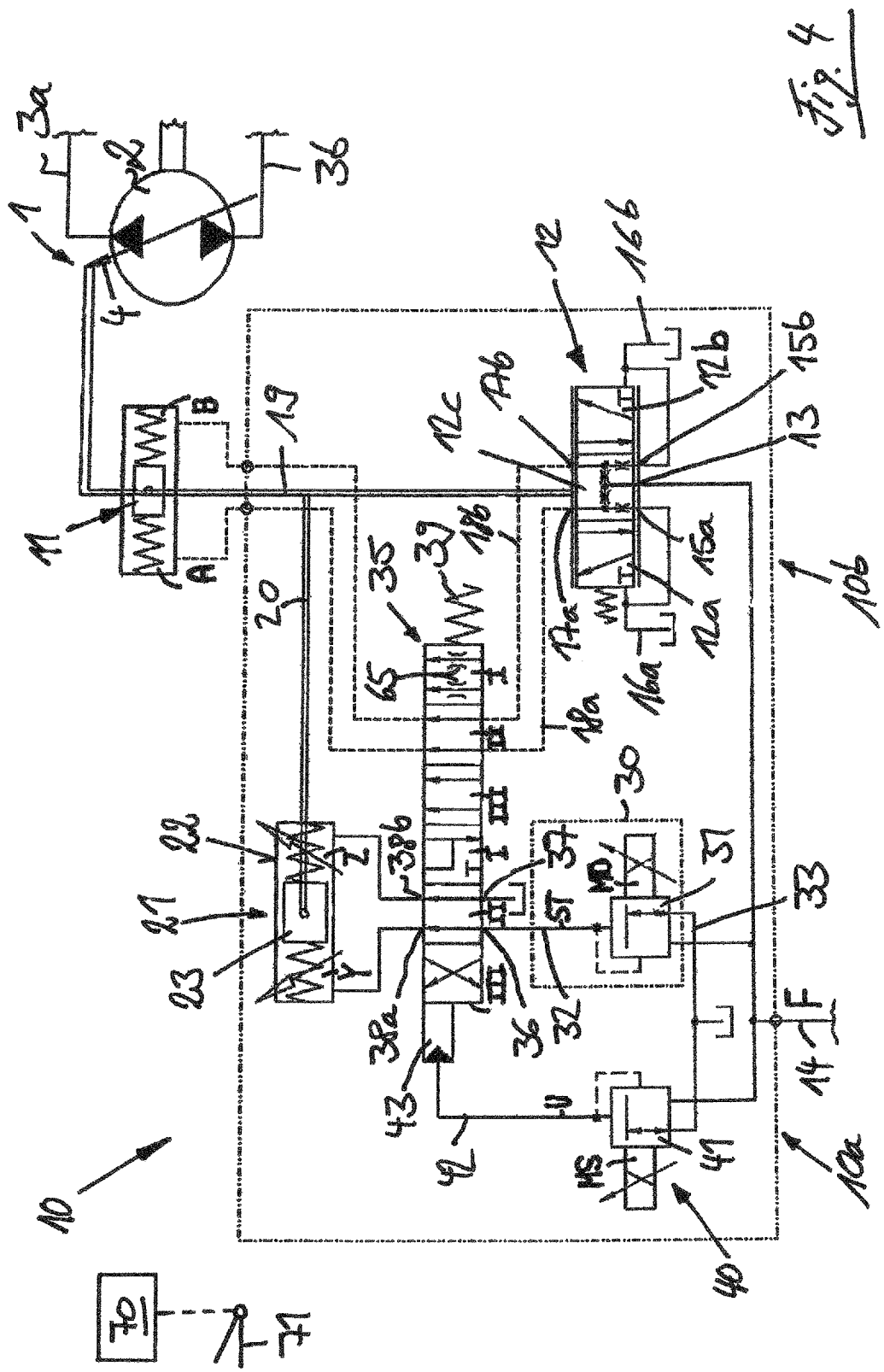
FIG. 4 is a second development of FIG. 1.

FIG. 4 shows a development of the invention which, in the safety position I of the valve device 35, integrates an orifice structure 65 in the control pressure lines 18a, 18b of the control piston device 11 and, thus, of the control circuit 10b.

The valve device 35 is provided with corresponding connections to the control pressure lines 18a, 18b and in all switched positions I, II, III forms flow sections of the control pressure lines 18a, 18b. The orifice structures 65 of the control circuit 10b, e.g., formed by nozzles or throttles in the flow segments of the control pressure lines 18a, 18b, is active only in the safety position I. The orifice structures 65 are not active in the control position II for the first direction of displacement and in the control position III for the second direction of displacement of the variable displacement pump 2. The orifice structures 65 therefore form a switchable control circuit throttling means with which, in the safety position I, the reset speed of the displacement volume control mechanism 4 into the neutral position and, on a hydrostatic traction drive, the deceleration of the vehicle, can be defined.

The invention has a series of advantages.

The electro-hydraulic control device 10 of the invention has only a single electro-hydraulic setpoint encoder 30 for the specification of the setpoint of the displacement volumes for both directions of displacement of the variable displacement pump 2. The association of the control pressure ST generated by the setpoint encoder 30 with the corresponding control pressure chamber Y or Z, respectively, of the slave piston 23 for the corresponding direction of displacement of the variable displacement pump 2 is achieved by the electrically actuatable valve device 35, which represents an electro-proportional valve axis. The valve device 35 is also provided with the safety function, with which when the magnet MS is not actuated, the valve device 35 is moved by the spring device 39 into the safety position I in which the variable displacement pump 2 is reset securely into the neutral position in which the displacement volume is zero.

Compared to an electro-hydraulic control device 10 of the known art, while the safety requirements remain the same, a second electro-hydraulic setpoint encoder with a valve axis for its installation and with a corresponding magnet for its actuation can be eliminated. As a result of which, the construction effort and expense and the space requirements are all reduced. Because the electro-hydraulic control device 10 of the invention has only two magnets MD, MS, the construction effort and expense for the electronic control device 70 are less than those of the known art due to the elimination of a third control output for the third magnet.

The reduced number of magnets also results in a simplification of the wiring harness, which further reduces the cost.

In addition, compared to a variable displacement pump of the known art, the ability to deactivate the setpoint encoder, which is in the form of a pressure reducing valve, is also eliminated. As a result of which, the construction effort and expense can be reduced even further.

With the integration of the switchable orifice structure 65 of the control circuit 10b into the valve device 35 as illustrated in FIG. 4, further simplification, i.e., reduction of the amount of space required and a reduction of costs, becomes possible because an additional valve with a corresponding valve axis for its installation is not required for the switchable orifice structure 65 of the control circuit 10b.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A hydrostatic variable displacement pump, comprising:
an electro-hydraulic control device comprising a single electro-hydraulic setpoint encoder configured to specify a setpoint of a displacement volume of a variable displacement pump; and
an electrically actuatable control valve located in series downstream of the setpoint encoder, by means of which displacement directions of the variable displacement pump are controlled and which includes a safety function such that in a fault scenario the variable displacement pump is set to a neutral position in which the displacement volume is zero,
wherein the electrically actuatable control valve includes a tank connection, a first control connection in communication with a first control pressure chamber of a slave piston device of the control device that acts in a direction of a first direction of displacement, and a second control connection in communication with a second control pressure chamber of the slave piston device that acts in a direction of a second displacement direction,
wherein the slave piston device actuates a position-controlled control valve of the control device, which actuates a control piston device of the variable displacement pump which is operatively connected with a displacement volume control mechanism,
wherein the slave piston device is mechanically coupled to the position-controlled control valve and the control piston device,
wherein a first beam mechanically connects, at a first location, a piston of the control piston device to the position-controlled control device and, at a second location, mechanically connects the piston of the control piston device to the displacement volume control mechanism, and
wherein a second beam mechanically connects the piston of the slave piston device to the first beam at a location between the first location and the second location.

2. The hydrostatic variable displacement pump as recited in claim 1, wherein the electro-hydraulic setpoint encoder is in communication on an input side with a control pressure source and is in communication on an output side with a control pressure connection of the control valve.

3. The hydrostatic variable displacement pump as recited in claim 1, wherein the electro-hydraulic setpoint encoder is an electrically actuatable pressure reducing valve.

4. The hydrostatic variable displacement pump as recited in claim 1, wherein the slave piston device is spring-centered.

5. The hydrostatic variable displacement pump as recited in claim 1, wherein the control valve for control of the displacement directions of the variable displacement pump includes a first control position for the first direction of displacement in which a control pressure connection is in communication with the first control connection and the second control connection is in communication with the tank connection, and a second control position for the second direction of displacement in which the control pressure connection is in communication with the second control connection and the first control connection is in communication with the tank connection.

6. The hydrostatic variable displacement pump as recited in claim 5, wherein the control valve device is actuated by a spring device into the safety position and is actuated by an electrical actuator device toward the first control position or the second control position.

7. The hydrostatic variable displacement pump as recited in claim 6, wherein the electrical actuator device comprises an electrically actuatable pressure reducing valve that generates an actuation pressure that actuates the control valve.

8. The hydrostatic variable displacement pump as recited in claim 1, wherein for the safety function the control valve includes a safety position in which the first control connection and the second control connection are connected with the tank connection and/or are short-circuited.

9. The hydrostatic variable displacement pump as recited in claim 8, wherein the control pressure connection is shut off in the safety position.

10. The hydrostatic variable displacement pump as recited in claim 1, wherein the control valve comprises a spool valve with a longitudinally displaceable valve member.

11. The hydrostatic variable displacement pump as recited in claim 1, wherein the control valve includes an orifice structure for the control pressure chambers of the slave piston device and which is active in the safety function.

12. The hydrostatic variable displacement pump as recited in claim 1, wherein the position-controlled control valve includes a control pressure supply connection in communication with the control pressure source, at least one tank connection in communication with the tank, a first control pressure connection in communication with a first control pressure chamber of the control piston device by a first control pressure line, and a second control pressure connection in communication with a second control pressure chamber of the control piston device by a second control pressure line.

13. The hydrostatic variable displacement pump as recited in claim 12, wherein the control valve includes an orifice structure in the control pressure lines of the control piston device and which is active in the safety function.

14. The hydrostatic variable displacement pump as recited in claim 13, wherein the control valve forms flow segments of the control pressure lines, in which the orifice structures comprise throttle devices and are active only in the safety position.

15. The hydrostatic variable displacement pump as recited in claim 1, wherein the control piston device is spring-centered.

16. A hydrostatic transmission forming a hydrostatic traction drive of a vehicle, comprising:
   a hydrostatic variable displacement pump comprising:
   an electro-hydraulic control device comprising a single electro-hydraulic setpoint encoder configured to specify a set point of a displacement volume of the variable displacement pump; and
   an electrically actuatable control valve located in series downstream of the setpoint encoder, by means of which displacement directions of a variable displacement pump are controlled and which includes a safety function such that in a fault scenario the variable displacement pump is set to a neutral position in which the displacement volume is zero; and
   at least one hydraulic motor,
   wherein the hydrostatic variable displacement pump is in communication in a closed circuit with the at least one hydrostatic motor,
   wherein the electrically actuatable control valve includes a tank connection, a first control connection in communication with a first control pressure chamber of a slave piston device of the control device that acts in a direction of a first direction of displacement, and a second control connection in communication with a second control pressure chamber of the slave piston device that acts in a direction of a second displacement direction,
   wherein the slave piston device actuates a position-controlled control valve of the control device, which actuates a control piston device of the variable displacement pump which is operatively connected with a displacement volume control mechanism,
   wherein the slave piston device is mechanically coupled to the position-controlled control valve and the control piston device,
   wherein a first beam mechanically connects, at a first location, a piston of the control piston device to the position-controlled control device and, at a second location, mechanically connects the piston of the control piston device to the displacement volume control mechanism, and
   wherein a second beam mechanically connects the piston of the slave piston device to the first beam at a location between the first location and the second location.

* * * * *